(12) United States Patent
Zhou et al.

(10) Patent No.: US 10,730,159 B2
(45) Date of Patent: Aug. 4, 2020

(54) HIGH-PRECISION TENSIONING DEVICE

(71) Applicant: CITIC Dicastal CO., LTD., Qinhuangdao, Hebei (CN)

(72) Inventors: Ruixiao Zhou, Qinhuangdao (CN); Zhiyuan Yu, Qinhuangdao (CN); Minghua Liu, Qinhuangdao (CN); Huiying Liu, Qinhuangdao (CN); Weidong Liu, Qinhuangdao (CN); Fengbao Luo, Qinhuangdao (CN); Dengyao Li, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 519 days.

(21) Appl. No.: 15/609,504

(22) Filed: May 31, 2017

(65) Prior Publication Data
US 2017/0361412 A1    Dec. 21, 2017

(30) Foreign Application Priority Data

Jun. 15, 2016  (CN) .......................... 2016 1 0424398

(51) Int. Cl.
  *B23Q 17/00* (2006.01)
  *B23B 31/16* (2006.01)
  *B23Q 3/14* (2006.01)

(52) U.S. Cl.
  CPC ............ *B23Q 17/005* (2013.01); *B23B 31/16* (2013.01); *B23Q 3/14* (2013.01);
  (Continued)

(58) Field of Classification Search
  CPC ....... B23B 31/16; B23B 31/107; B23B 31/12; B23B 31/16004; B23B 31/16195;
  (Continued)

(56) References Cited

U.S. PATENT DOCUMENTS

| | | | | |
|---|---|---|---|---|
| 2,853,876 A | * | 9/1958 | Majkrzak ................ | H04Q 1/20 73/161 |
| 3,109,477 A | * | 11/1963 | Avera ...................... | B21D 9/01 72/466 |

(Continued)

FOREIGN PATENT DOCUMENTS

| | | |
|---|---|---|
| CN | 203579225 U | 5/2014 |
| CN | 104475791 A | 4/2015 |

(Continued)

OTHER PUBLICATIONS

Cytrontech (found on https://www.youtube.com/watch?v=4YLTHjbZVP0 (Year: 2011).*

(Continued)

*Primary Examiner* — Monica S Carter
*Assistant Examiner* — Mahdi H Nejad
(74) *Attorney, Agent, or Firm* — Cooper Legal Group, LLC

(57) ABSTRACT

A high-precision tensioning device is provided. The high-precision tensioning device is composed of a stepping motor, an encoder, a harmonic reducer, a rotary table, connecting rods, contacts, force sensors, a rotary table connecting piece, a gasket, a nut, bolts, a set screw, a shell and an end cover. The tensioning device provided by the disclosure can achieve closed-loop control on a tensioning force in order to improve the tensioning precision of the tensioning device; and as long as machining and assembling errors meet design requirements, stable synchronous tensioning of three contacts can be ensured, and the location precision of a hub is improved.

4 Claims, 2 Drawing Sheets

(52) U.S. Cl.
CPC ... *B23B 2260/076* (2013.01); *B23B 2260/128* (2013.01); *B23Q 2703/06* (2013.01); *Y02P 70/167* (2015.11); *Y02P 70/173* (2015.11); *Y10T 279/19* (2015.01)

(58) Field of Classification Search
CPC ...... B23B 31/40; B23Q 2703/06; B23Q 3/00; B23Q 3/06; B23Q 3/067; B25B 11/00; B23P 11/00; B23P 19/10; Y10T 279/1961; Y10T 279/1953; Y10T 279/19; Y10T 279/1074
USPC .......................................... 269/48.1, 309–310
See application file for complete search history.

(56) References Cited

U.S. PATENT DOCUMENTS

| | | | | |
|---|---|---|---|---|
| 4,164,135 | A | * | 8/1979 | Clavin ..................... B21D 9/05 269/48.1 |
| 5,848,795 | A | | 12/1998 | Masatsugu |
| 2003/0222415 | A1 | * | 12/2003 | Mandokoro ............ B23B 31/16 279/118 |
| 2013/0147133 | A1 | * | 6/2013 | Kaleja ................. B23B 31/1627 279/126 |

FOREIGN PATENT DOCUMENTS

| | | |
|---|---|---|
| CN | 105499625 A | 4/2016 |
| CN | 205660180 U | 10/2016 |
| FR | 2264628 A1 | 10/1975 |

OTHER PUBLICATIONS

Childs, Peter R.N.. (2004). Mechanical Design (2nd Edition)—5.2 Shaft-Hub Connection. Elsevier. Retrieved from https://app.knovel.com/hotlink/pdf/id:kt00BIDHX1/mechanical-design-2nd/shaft-hub-connection. (Year: 2004).*

* cited by examiner

HIGH-PRECISION TENSIONING DEVICE

CROSS-REFERENCE TO RELATED APPLICATIONS

This application is filed based upon and claims priority to Chinese Patent Application No. 201610424398.0, filed on Jun. 15, 2016, the entire contents of which are incorporated herein by reference.

TECHNICAL FIELD

The disclosure relates to a tensioning device, and in particular to a high-precision tensioning device for tensioning a central hole of a hub in an automobile aluminum alloy hub machining process.

BACKGROUND

It needs a tensioning device to clamp a central hole of a hub in an automobile hub machining process, and due to higher requirement of the machining precision of the hub, it is necessary to require that the tensioning device has excellent precision.

In one aspect, it needs that the tensioning device can provide a stable tensioning force in a hub machining process. If the tensioning force is smaller than a certain numerical value, the hub cannot be well clamped and is possible to loosen in the machining process, thereby seriously influencing the machining quality of the hub; and if the tensioning force is larger than a certain numerical value, the hub will generate elastic deformation, even plastic deformation, thereby directly influencing the size precision of the hub. Furthermore, if the tensioning force is larger in the machining process, and when the tensioning device is loosened after the hub is machined, the hub generates a stress release situation, so that the machining precision of the hub is influenced again.

In the other aspect, the tensioning device generally is provided with multiple contacts, and the contacts need to have excellent synchronicity to ensure the machining precision of the hub. If the contacts cannot synchronously act on an inner hole of the hub, the hub may be inclined, and then the final machining size of the hub is extremely poor.

In view of the requirements in the above two aspects, there is an urgent need of developing a high-precision tensioning device to meet higher requirement of the machining precision of the hub.

SUMMARY

An high-precision tensioning device applied to a hub machining process is provided.

In one embodiment of the disclosure, a novel tensioning device is fixed on a base after penetrating through a hub machining base and an inner hole of a hub. The novel tensioning device is mainly composed of a stepping motor, an encoder, a harmonic reducer, a rotary table, connecting rods, contacts, force sensors, a rotary table connecting piece, a gasket, a nut, bolts, a set screw, a shell and an end cover. The back end of the stepping motor is connected with the encoder, an output end of the stepping motor is connected with the harmonic reducer, the harmonic reducer is fixed on the internal structure of the shell by the bolts, and an output shaft of the harmonic reducer is connected with the rotary table connecting piece through the set screw. The rotary table is connected with the rotary table connecting piece through threads, and is fastened with the nut through the gasket. Three protruded eccentric shafts are uniformly distributed at the outer edge of the rotary table and are connected with the connecting rods, and the other ends of the connecting rods are connected with small protruded shafts of the contacts. The contacts are mounted in circular holes of the shell and are set to only axially move along the circular holes. Therefore, the rotary table, the connecting rods, the contacts and the circular holes of the shell form a typical slider-crank mechanism. When the stepping motor drives the harmonic reducer to rotate, the connecting rods drive the contacts to do linear motion, and the contacts are set to utilize the linear motion to complete operations of tensioning and loosening the inner hole of the hub.

In one aspect of the disclosure, a high-precision tensioning device is provided. The high-precision tensioning device is composed of a stepping motor (2-6), an encoder (2-5), a harmonic reducer (2-7), a rotary table (2-2), connecting rods (2-3), contacts (2-4), force sensors (2-12), a rotary table connecting piece (2-8), a gasket (2-10), a nut (2-9), bolts (2-14), a set screw (2-13), a shell (2-1) and an end cover (2-11). The high-precision tensioning device is characterized in that the back end of the stepping motor (2-6) is connected with the encoder (2-5), and an output end of the stepping motor (2-6) is connected with the harmonic reducer (2-7); the harmonic reducer (2-7) is fixed on the internal structure of the shell (2-1) by the bolts (2-14), and an output shaft of the harmonic reducer (2-7) is connected with the rotary table connecting piece (2-8) through the set screw (2-13); the rotary table (2-2) is connected with the rotary table connecting piece (2-8) through threads, and is fastened with the nut (2-9) through the gasket (2-10); three protruded eccentric shafts are uniformly distributed at the outer edge of the rotary table (2-2) and are connected with the connecting rods (2-3), and the other ends of the connecting rods (2-3) are connected with small protruded shafts of the contacts (2-4); the contacts (2-4) are mounted in circular holes of the shell (2-1) and are set to only axially move along the circular holes, so that the rotary table (2-2), the connecting rods (2-3), the contacts (2-4) and the circular holes of the shell (2-1) form a slider-crank mechanism; when the stepping motor (2-6) drives the harmonic reducer (2-7) to rotate, the connecting rods (2-3) drive the contacts (2-4) to do linear motion, and the contacts (2-4) are set to utilize the linear motion to complete operations of tensioning and loosening an inner hole of a hub (4); and each force sensor (2-12) is mounted in the corresponding contact (2-4), measures the size of a tensioning force between the corresponding contact (2-4) and the inner hole of the hub (4) in real time and transmits the measured size of the tensioning force to a controller of the stepping motor (2-6) in real time, and once the size of the tensioning force is beyond a range allowed by the hub (4), the controller controls the rotation of the stepping motor (2-6) to adjust the size of the tensioning force.

In one preferable aspect of the disclosure, the number of the contacts (2-4) is three and the three contacts (2-4) are driven by the same rotary table (2-2).

In one preferable aspect of the disclosure, a step angle of the stepping motor is smaller than or equal to 0.9 degrees.

In one preferable aspect of the disclosure, the step angle of the stepping motor is subdivided by the encoder (2-5) and the harmonic reducer (2-7).

The tensioning device provided by the disclosure can achieve the closed-loop control on the tensioning force in order to improve tensioning precision thereof. Specifically, each force sensor is mounted in the corresponding contact, measures the size of a tensioning force between the corresponding contact and the inner hole of the hub in real time and transmits the measured size of the tensioning force to the controller of the stepping motor in real time. Once the size of the tensioning force is beyond a range allowed by the hub, the controller controls the rotation of the stepping motor to adjust the size of the tensioning force. The step angle of the stepping motor can be as low as, even lower than, 0.9 degrees, the step angle of the stepping motor is subdivided by the encoder, and finally, a rotation angle of the stepping motor can be largely subdivided by the harmonic reducer, so that the stepping motor can achieve tiny-angle rotation. Therefore, a high-precision tensioning force adjustment function of each contact can be achieved by controlling the slight rotation of the stepping motor. Furthermore, the tensioning device provided by the disclosure only has one prime motor, and the three contacts are driven by the same rotary table, so that as long as machining and assembling errors meet the design requirements, stable synchronous tensioning of the three contacts can be ensured, and the location precision of the hub is improved. According to the high-precision tensioning device provided by the disclosure, synchronous motion of the three contacts is achieved by utilizing the simple slider-crank mechanism, and the closed-loop control on the tensioning force is achieved by utilizing universal components, so that the adjustment precision of the tensioning device can be up to a very high degree and is enough to meet the requirement of the machining precision of the existing hub.

BRIEF DESCRIPTION OF THE DRAWINGS

The following describes embodiments of the disclosure in detail in combination with figures, wherein.

In the figures, numeric symbols are as follows: 1—base, 2—high-precision tensioning device, 3—hub machining base, 4—hub, A—first section view direction of the high-precision tensioning device, 2-1—shell, 2-2—rotary table, 2-3—connecting rod, 2-4—contact, B:B-B—second section view direction of the high-precision tensioning device, A-A—first section view of the high-precision tensioning device, 2-5—encoder, 2-6—stepping motor, 2-7—harmonic reducer, 2-8—rotary table connecting piece, 2-9—nut, 2-10—gasket, 2-11—end cover, 2-12—force sensor, 2-13—set screw, 2-14—bolt, and B-B—second section view of the high-precision tensioning device.

DETAILED DESCRIPTION

Embodiment 1

In the following, the details and working stations of a device provided by the disclosure are described in combination with figures.

Figure 1:
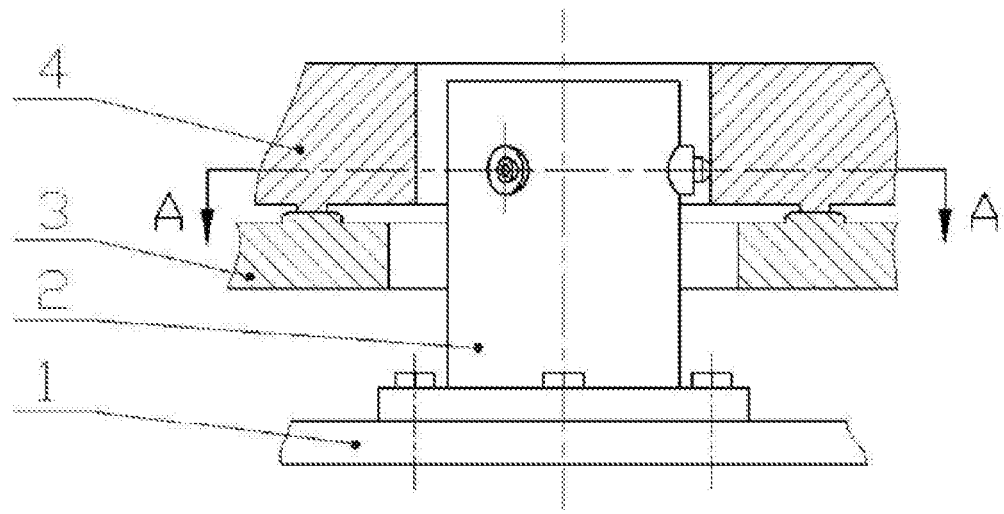
FIG. 1 is an installation schematic diagram of a high-precision tensioning device provided by the disclosure.
Figure 2:
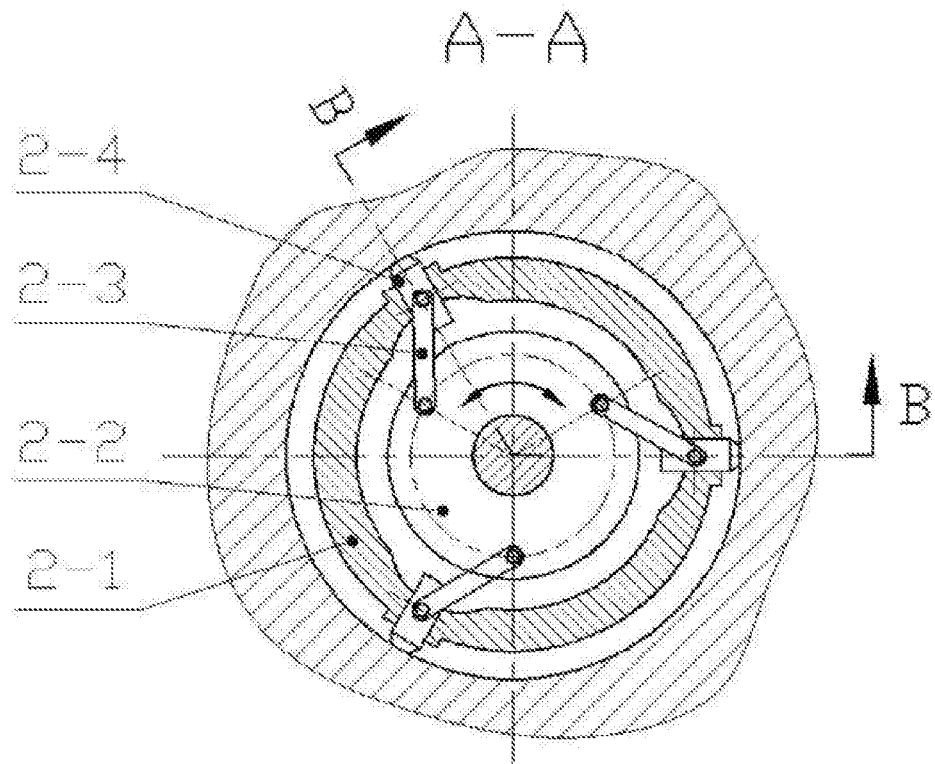
FIG. 2 is an A-A section view of a high-precision tensioning device provided by the disclosure.
Figure 3:
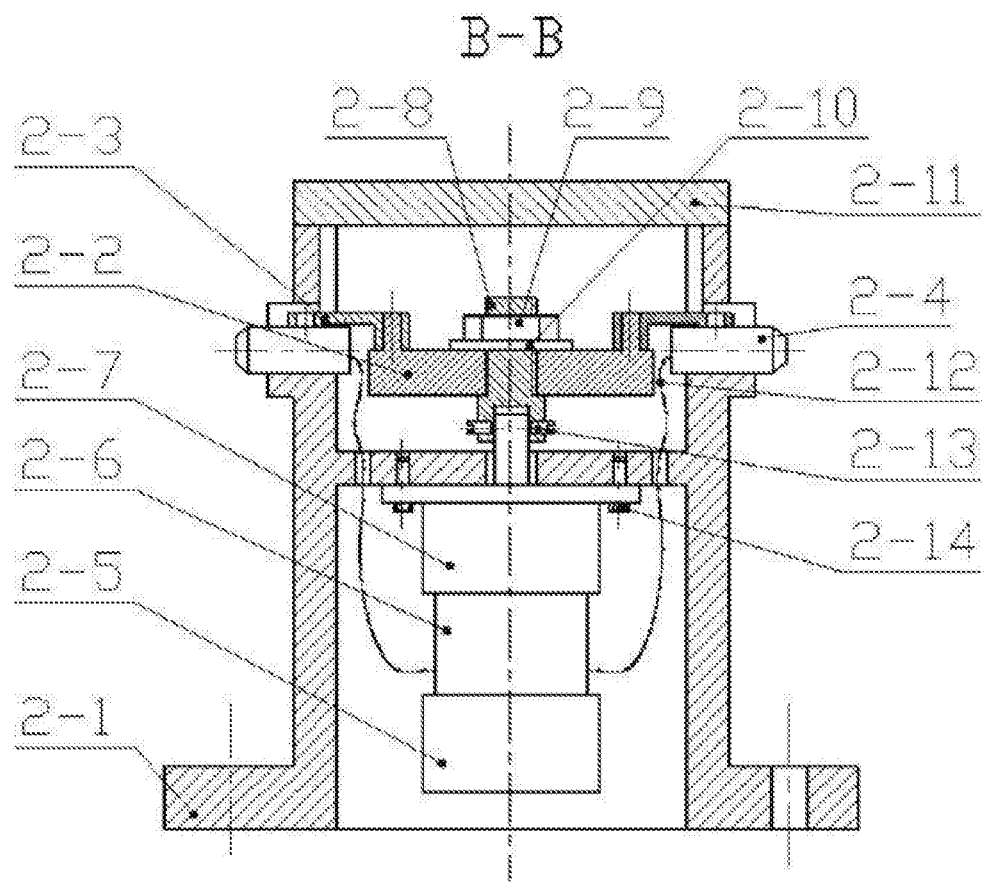
FIG. 3 is a B-B section view when central lines of connecting rods move to be in parallel with axial lines of contacts.

The embodiment provides a novel tensioning mechanism, the installation of which is shown in FIG. 1. The high-precision tensioning device 2 is fixed on a base 1 after penetrating through a hub machining base 3 and an inner hole of a hub 4. The novel tensioning device is mainly composed of a stepping motor 2-6, an encoder 2-5, a harmonic reducer 2-7, a rotary table 2-2, connecting rods 2-3, contacts 2-4, force sensors 2-12, a rotary table connecting piece 2-8, a gasket 2-10, a nut 2-9, bolts 2-14, a set screw 2-13, a shell 2-1 and an end cover 2-11. The high-precision tensioning device is characterized in that the back end of the stepping motor 2-6 is connected with the encoder 2-5, and an output end of the stepping motor 2-6 is connected with the harmonic reducer 2-7; the harmonic reducer 2-7 is fixed on the internal structure of the shell 2-1 by the bolts 2-14, and an output shaft of the harmonic reducer 2-7 is connected with the rotary table connecting piece 2-8 through the set screw 2-13; the rotary table 2-2 is connected with the rotary table connecting piece 2-8 through threads, and is fastened with the nut 2-9 through the gasket 2-10; three protruded eccentric shafts are uniformly distributed at the outer edge of the rotary table 2-2 and are connected with the connecting rods 2-3, and the other ends of the connecting rods 2-3 are connected with small protruded shafts of the contacts 2-4; the contacts 2-4 are mounted in circular holes of the shell 2-1 and are set to only axially move along the circular holes, so that the rotary table 2-2, the connecting rods 2-3, the contacts 2-4 and the circular holes of the shell 2-1 form a typical slider-crank mechanism; and when the stepping motor 2-6 drives the harmonic reducer 2-7 to rotate, the connecting rods 2-3 drive the contacts 2-4 to do linear motion, and the contacts 2-4 are set to utilize the linear motion to complete operations of tensioning and loosening an inner hole of the hub 4.

The tensioning device provided by the disclosure can achieve the closed-loop control on the tensioning force in order to improve the tensioning precision of the tensioning device. Each force sensor 2-12 is mounted in the corresponding contact 2-4, measures the size of a tensioning force between the corresponding contact 2-4 and the inner hole of the hub 4 in real time and transmits the measured size of the tensioning force to the controller of the stepping motor 2-6 in real time. Once the size of the tensioning force is beyond a range allowed by the hub 4, the controller controls the rotation of the stepping motor 2-6 to adjust the size of the tensioning force. The step angle of the stepping motor can be as low as, even lower than, 0.9 degrees, the step angle of the stepping motor is subdivided by the encoder 2-5, and finally, a rotation angle of the stepping motor 2-6 can be largely subdivided by the harmonic reducer 2-7, so that the stepping motor 2-6 can achieve tiny-angle rotation. Therefore, a high-precision tensioning force adjustment function of each contact 2-4 can be achieved by controlling the slight rotation of the stepping motor 2-6.

Furthermore, the tensioning device in the embodiment provided by the disclosure only has one prime motor, and the three contacts 2-4 are driven by the same rotary table 2-2; therefore, as long as machining and assembling errors meet the design requirements, a certain synchronicity of the three contacts can be ensured, and the location precision of the hub 4 is improved.

In the embodiment, the synchronous motion of the three contacts 2-4 is achieved by utilizing the simple slider-crank mechanism, and the closed-loop control on the tensioning force is achieved by utilizing the universal components, so that the very high adjustment precision of the tensioning device can be achieved according to the requirements and is so enough to meet the requirement of the machining precision of the existing hub.

What is claimed is:

1. A high-precision tensioning device, comprising a stepping motor, an encoder, a harmonic reducer, a rotary table, connecting rods, contacts, force sensors, a rotary table connecting piece, a gasket, a nut, bolts, a set screw, a shell and an end cover, wherein a back end of the stepping motor is connected with the encoder, and an output end of the stepping motor is connected with the harmonic reducer; the harmonic reducer is fixed on an internal structure of the shell by the bolts, and an output shaft of the harmonic reducer is connected with the rotary table connecting piece through the set screw; the rotary table is connected with the rotary table connecting piece through threads, and is fastened with the nut through the gasket; three protruded eccentric shafts are uniformly distributed at an outer edge of the rotary table and are connected with first ends of the connecting rods, and second ends of the connecting rods are connected with small protruded shafts of the contacts; the contacts are mounted in circular holes of the shell and are set to only axially move along the circular holes of the shell, so that the rotary table, the connecting rods, the contacts and the circular holes of the shell form a slider-crank mechanism, wherein an overall size of each of the contacts is smaller than a size of each of the circular holes of the shell; when the stepping motor drives the harmonic reducer to rotate, the connecting rods drive the contacts to do linear motion, and the contacts are set to utilize the linear motion to complete operations of tensioning and loosening an inner hole of a hub; and each force sensor of the force sensors is mounted in a corresponding contact of the contacts, measures a size of a tensioning force between the corresponding contact and the inner hole of the hub in real time and transmits the size of the tensioning force to a controller of the stepping motor in real time, and once the size of the tensioning force is beyond a range allowed by the hub, the controller controls rotation of the stepping motor to adjust the size of the tensioning force, wherein each of the contacts comes into contact with the inner hole of the hub when tensioning the inner hole of the hub, and each of the contacts is separated from the inner hole of the hub when loosening the inner hole of the hub.

2. The high-precision tensioning device according to claim 1, wherein a number of the contacts is three and the three contacts are driven by the rotary table.

3. The high-precision tensioning device according to claim 1, wherein a step angle of the stepping motor is smaller than or equal to 0.9 degrees.

4. The high-precision tensioning device according to claim 3, wherein the step angle of the stepping motor is subdivided by the encoder and the harmonic reducer.

* * * * *